US011137739B2

(12) United States Patent
Takahei et al.

(10) Patent No.: US 11,137,739 B2
(45) Date of Patent: Oct. 5, 2021

(54) NUMERICAL CONTROL SYSTEM

(71) Applicant: Mitsubishi Electric Corporation, Tokyo (JP)

(72) Inventors: Kazuki Takahei, Tokyo (JP); Toshihiro Azuma, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/638,150

(22) PCT Filed: Aug. 28, 2017

(86) PCT No.: PCT/JP2017/030661
§ 371 (c)(1),
(2) Date: Feb. 11, 2020

(87) PCT Pub. No.: WO2019/043742
PCT Pub. Date: Mar. 7, 2019

(65) Prior Publication Data
US 2020/0225638 A1    Jul. 16, 2020

(51) Int. Cl.
*G05B 19/404*    (2006.01)
*B23Q 15/12*    (2006.01)
(Continued)

(52) U.S. Cl.
CPC ........... *G05B 19/404* (2013.01); *B23Q 15/12* (2013.01); *G05B 19/4155* (2013.01); *G05B 19/4163* (2013.01)

(58) Field of Classification Search
CPC .............. G05B 19/404; G05B 19/4155; G05B 19/4163; G05B 2219/49201;
(Continued)

(56) References Cited

U.S. PATENT DOCUMENTS

2004/0258495 A1* 12/2004 Kakino ............. G05B 19/4065
  409/132
2010/0104388 A1*  4/2010 Suzuki ............... B23Q 17/0976
  409/131
(Continued)

FOREIGN PATENT DOCUMENTS

JP    2012-208921 A    10/2012
JP    2012-213851 A    11/2012
(Continued)

OTHER PUBLICATIONS

International Search Report and Written Opinion dated Oct. 10, 2017 for PCT/JP2017/030661 filed on Aug. 28, 2017, 9 pages including English Translation of the International Search Report.
(Continued)

*Primary Examiner* — Kenneth M Lo
*Assistant Examiner* — Mohammed Shafayet
(74) *Attorney, Agent, or Firm* — Xsensus LLP

(57) ABSTRACT

The numerical control system includes: detecting circuitry to obtain cutting force generated in a machine tool; controlling circuitry to calculate a control amount according to a cutting condition and to control a feed drive mechanism of the machine tool; countermeasure determining circuitry to, when it is detected from the cutting force or a state of the feed drive mechanism of the machine tool that a machining defect has occurred, calculate a plurality of deviation degrees for possible causes of the machining defect, and compare the calculated deviation degrees and to thereby determine a cause of the machining defect whose occurrence has been detected; and correction-amount calculating circuitry to calculate, according to the cause of the machining defect determined by the countermeasure determining circuitry, a correction amount with respect to the control
(Continued)

amount, and then output the correction amount to the controlling circuitry.

10 Claims, 11 Drawing Sheets

(51) Int. Cl.
*G05B 19/416* (2006.01)
*G05B 19/4155* (2006.01)

(58) Field of Classification Search
CPC ........... G05B 2219/49054; G05B 2219/41154;
G05B 2219/49186; G05B 2219/37258;
G05B 19/4065; B23Q 15/12
USPC ......................................................... 700/159
See application file for complete search history.

(56) References Cited

U.S. PATENT DOCUMENTS

| 2015/0306720 | A1* | 10/2015 | Ono | B23Q 17/0976 |
| | | | | 700/174 |
| 2017/0293862 | A1* | 10/2017 | Kamiya | G06N 3/0445 |
| 2017/0357243 | A1* | 12/2017 | Takayama | G06N 3/08 |

FOREIGN PATENT DOCUMENTS

| JP | 2013/038532 A | 3/2013 |
| JP | 2015-156194 A | 8/2015 |

OTHER PUBLICATIONS

Shamoto, E., "Mechanism and Suppression of Chatter Vibrations in Cutting" DAIDO Steel Technical Journal, DENKI-SEIKO, vol. 82, No. 2, 2011, pp. 143-155 (See English Abstract).

* cited by examiner

NUMERICAL CONTROL SYSTEM

CROSS-REFERENCE TO RELATED APPLICATION

The present application is based on PCT filing PCT/JP2017/030661, filed Aug. 28, 2017, the entire contents of which are incorporated herein by reference.

TECHNICAL FIELD

The present invention relates to a numerical control system to control a machine tool.

BACKGROUND ART

A machine tool is a machining device to perform removal machining by using a tool to apply force or energy to a workpiece. Especially in a cutting tool for performing removal machining, its cutting edge moving at a high speed is put into contact with the workpiece, to produce shear fractures on the workpiece surface and thereby remove unnecessary part of the workpiece.

In the cutting machining, various kinds of machining defects may occur. The causes of machining defects include, for example, chatter vibrations, tool deflections, tool wear, and friction in feed drive mechanism.

The chatter vibrations are classified into two types. One is self-excited chatter vibration in which vibrations generated in a machining part develop through the machine structure and its machining process. The other is forced chatter vibration in which the vibrations by intermittent cutting excite vibrations in the machine structure. Both chatter vibration types decrease machining accuracy and tool life.

The tool deflections are phenomena that, while the tool edge is cutting a workpiece, the tool receives cutting forces to bend from its non-cutting state, lowering the machining accuracy. The tool wear is a phenomenon that a cutting edge of the tool repeatedly collides the workpiece to be damaged. Thus, the tool wear lowers the quality of the machined surface and requires an increase of the cutting force.

The friction in feed drive mechanism is a friction at the sliding portion of the machine tool's feed drive system. When the characteristics of the friction in feed drive mechanism change due to movements or aging of the feed drive system, this produces a phenomenon that the relative position between the tool and the workpiece deviates from the commanded position.

Each of the phenomena mentioned above is known as a cause of a machining defect which hinders the productivity by the machine tool. Regarding the above-described cause of the machining defect, countermeasures to avoid or reduce the machining defect have been proposed.

Patent Document 1 describes a technique in which, in a case where determining that chatter vibrations have occurred, it is determined whether the chatter vibrations are a self-excited vibration type or a forced vibration type, and then a stable rotation speed of the spindle at which chatter vibrations do not occur is calculated according to the vibration type.

Patent Document 2 describes a technique in which the tool wear amount is calculated in time series according to the machining state, and in which when it is anticipated that the tool wear amount will exceed a limit value and it becomes necessary that the tool is replaced, the cutting condition is changed so that the ongoing machining can be completed without replacing the tool.

Patent Document 3 describes a technique in which a spindle rotation speed for reducing tool deflection is calculated from an amplitude at the time when the cutting force generated between the tool and the workpiece excites the workpiece to vibrate.

Patent Document 4 describes a technique in which the trajectory error caused by friction is corrected by correcting a torque command with a value obtained by multiplying an estimated friction force by the gain determined on the basis of the gain characteristics of the transfer function that relates the commanded position to the deviated position.

PRIOR ART DOCUMENTS

Patent Documents

Patent Document 1: Unexamined Patent Application Publication JP, 2012-213851, A
Patent Document 2: Unexamined Patent Application Publication JP, 2012-208921, A
Patent Document 3: Unexamined Patent Application Publication JP, 2012-540615, A
Patent Document 4: Unexamined Patent Application Publication JP, 2015-156194, A

SUMMARY OF THE INVENTION

Problems to be Solved by the Invention

In the technique described in Patent Document 1, the spindle rotation speed for suppressing chatter vibrations is calculated; therefore, when a worn tool is used or when a radial depth of cut is too large, it is impossible to suppress chatter vibrations by changing the spindle rotation speed.

In the technique described in Patent Document 2, cutting conditions are changed so that the wear amount to be increased in the machining process does not exceed a limit amount. This may cause a machining defect such as chatter vibrations and tool deflection, depending on the changed cutting conditions.

In the technique described in Patent Document 3, a spindle rotation speed for reducing tool deflection is calculated; therefore, in a case where the tool position errors are produced not by tool deflection but by friction in feed drive mechanism, it is impossible to reduce the machining defect by changing the spindle rotation speed.

In the technique described in Patent Document 4, torque commands are corrected so as to compensate trajectory errors caused by friction; therefore, in a case where cutting conditions such as the spindle rotation speed and the feeding speed are improper, the trajectory errors may be reduced but a machining defect such as chatter vibration and tool deflection occurs.

As described above, there are a plurality of causes of machining defects. To cope with them, each of the prior techniques narrows down machining defect causes to specific kinds of causes and provides countermeasure thereto. Therefore, in a case where a machining defect occurs from a cause rather than the narrowed ones, it has been impossible for each of the prior techniques to reduce machining defects.

Thus, the present invention is devised in view of the problems described above and to provide a numerical control system that is capable of identifying, when a machining defect occurs, a main cause of the machining defect and thereby providing a countermeasure to the identified cause.

Solution to Problems

The numerical control system according to the present invention includes: a detection unit to obtain cutting force generated in a machine tool; a control unit to calculate a control amount according to a cutting condition and to control a feed drive mechanism of the machine tool; a dynamic-characteristics-information storage unit to store dynamic characteristics information of a tool or a workpiece, in relation to the cutting condition; a machining-process-information storage unit to store information representing a machining process to occur between the tool and the workpiece, in relation to the cutting condition; a countermeasure determination unit to, when it is detected from the cutting force or a state of the feed drive mechanism of the machine tool that a machining defect has occurred, calculate a plurality of deviation degrees for possible causes of the machining defect, and compare the calculated deviation degrees and to thereby determine a cause of the machining defect whose occurrence has been detected; and a correction-amount calculation unit to calculate, according to the cause of the machining defect determined by the countermeasure determination unit, a correction amount with respect to the control amount, and then output the correction amount to the control unit.

Advantages of the Invention

When a machining defect occurs in a machine tool, the numerical control system according to the present invention is capable of determining a detected machining defect cause from among a plurality of kinds of machining defect causes.

EMBODIMENTS

Embodiment 1

In the description of the present invention, causes of machining defects detected are called as machining defect causes. To be concrete, the machining defect causes include chatter vibrations, tool deflections, tool wear, and friction in feed drive mechanism, which will be described below.

The chatter vibrations here are vibrations which occur during cutting machining. The chatter vibrations may lower the machining accuracy and harm the life span of the tool. The chatter vibration is classified into self-excited chatter vibrations and forced chatter vibrations. The self-excited chatter vibrations are exponentially amplified by a cutting process itself. The forced chatter vibrations are generated by vibrating the machine structure with the cutting force.

The tool deflections are phenomena in which the tool edge is bent by receiving a cutting force, lowering the machining accuracy.

The tool wear is a phenomenon that the cutting edge of the tool repeatedly touches the workpiece to be worn out. The tool wear lowers the quality of the machined surface and requires an increase of the cutting force.

The friction in feed drive mechanism is a friction at the sliding portion of the machine tool's feed drive mechanism. When the characteristics of the friction in feed drive mechanism change due to the feed drive mechanism's movements or aging, this produces a phenomenon that the relative position between the tool and the workpiece deviates from the commanded position.

The numerical control system according to Embodiment 1 detects the occurrence of a machining defect in a machine tool; when detecting the occurrence of a machining defect, the numerical control system calculates respective deviation degrees for machining defect causes. Then, the numerical control system compares the deviation degrees, to determine a machining defect cause that gives the largest deviation degree, and to add a correction to the control amount corresponding to the determined machining defect cause.

Figure 1:
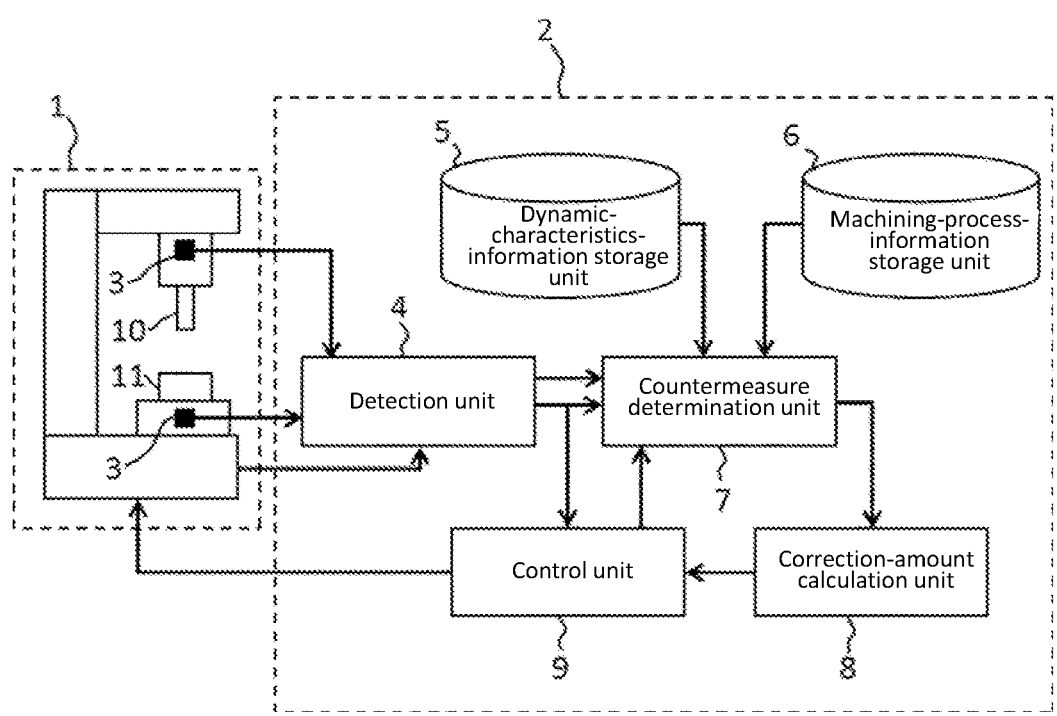
FIG. 1 is a block diagram of a numerical control system according to Embodiment 1 of the present invention.

FIG. 1 is a block diagram of a numerical control system according to Embodiment 1 of the present invention. In FIG. 1, the machine tool 1 includes a tool 10 that rotates at a high speed. The cutting edge of the tool 10 touches the workpiece 11 to cut it. The tool 10 is, for example, an end mill or a drill.

In the machine tool 1, a sensor 3 is provided to one or both of the feed drive mechanism and the table. The sensor 3 outputs a sensor signal to the numerical control system 2. Sensors 3 may be provided for a plurality of feed drive mechanisms. Here, the feed drive mechanisms include a servo shaft and the spindle.

The sensor 3 measures a force generated in the machine tool 1, an acceleration, a speed, a position or the like. A force sensor, an acceleration sensor, a speed sensor or a displacement sensor is used for the sensor 3 according to a measurement target. The sensor 3 may be an encoder provided to a feed drive mechanism motor of the machine tool 1 or a linear scale provided to a guide mechanism of the machine tool 1. The sensor 3 may measure the angular acceleration, angular speed or angle of a rotary feed drive mechanism.

The sensor 3 may be a combination of a plurality of sensors described above. Measurement means may be provided along the directions of a plurality of feed drive mechanisms to measure the position, speed and acceleration with respect to each mechanism movement.

According to a cutting condition having been set internally, the numerical control system 2 controls feed drive mechanism states of the machine tool 1 such as the feed drive mechanism's position, speed and current, to machine a workpiece. Here, the cutting condition is a combination of conditions such as tool shape, tool material, workpiece shape, workpiece material, machining path, cutting speed for each path, feeding speed therefor, axial depth of cut therefor, and radial depth of cut therefor.

The numerical control system 2 includes a detection unit 4, a dynamic-characteristics-information storage unit 5, a machining-process-information storage unit 6, a countermeasure determination unit 7, a correction-amount calculation unit 8 and a control unit 9. The detection unit 4 receives signals from the sensors 3. The dynamic-characteristics-information storage unit 5 stores dynamic characteristics information and outputs the dynamic characteristics information to the countermeasure determination unit 7. The machining-process-information storage unit 6 stores machining process information and outputs the machining process information to the countermeasure determination unit 7.

The countermeasure determination unit 7 determines a cause of a machining defect having occurred. The correction-amount calculation unit 8 calculates a correction amount according to the machining defect cause. The control unit 9 updates a control amount on the basis of the correction amount received from the correction-amount calculation unit 8.

Figure 2:
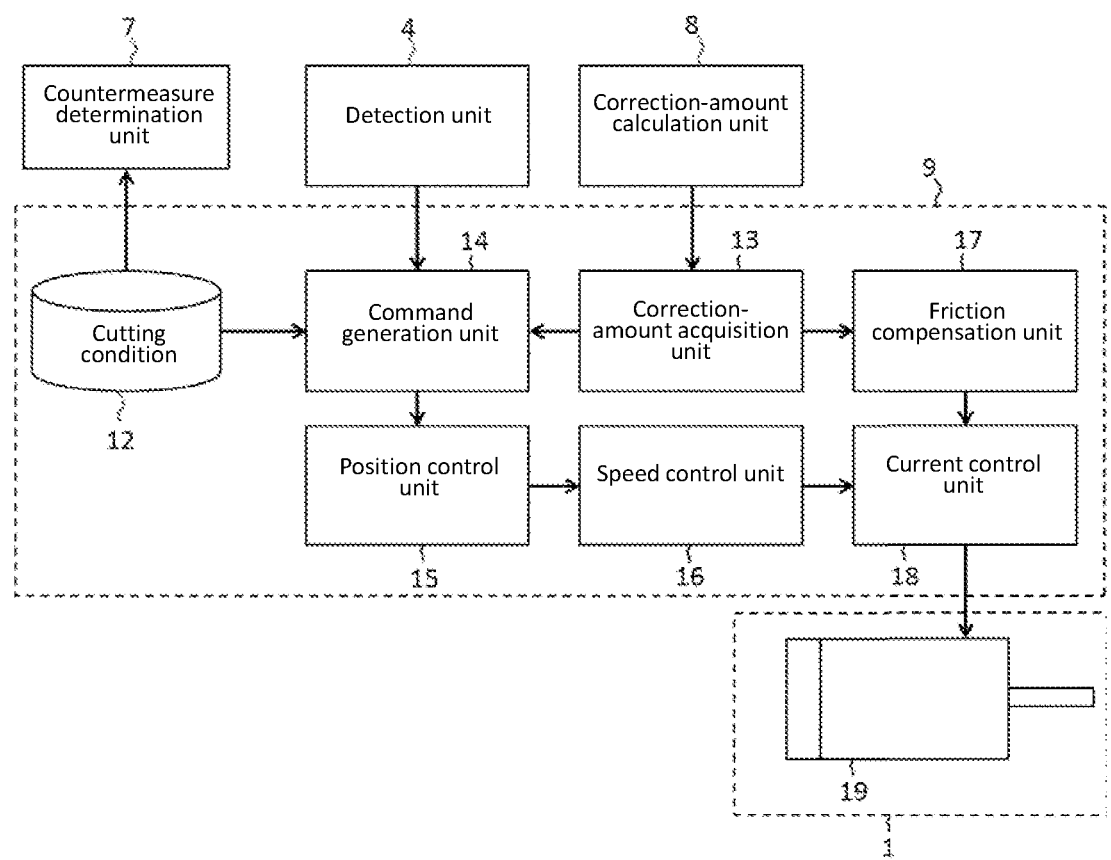
FIG. 2 is a configuration diagram of a control unit of the numerical control system according to Embodiment 1 of the present invention.

FIG. 2 is a configuration diagram of the control unit 9 of the numerical control system 2 according to Embodiment 1 of the present invention. FIG. 2 shows the components of the control unit 9, and shows the countermeasure determination unit 7, the detection unit 4, the correction-amount calculation unit 8 and a motor 19 as well. A correction-amount acquisition unit 13 acquires the correction amount calculated by the correction-amount calculation unit 8 and outputs the correction amount to a command generation unit 14 and a friction compensation unit 17. The command generation unit 14 receives signals from the detection unit 4, and generates a position command while monitoring the feed drive mechanism's state of the machine tool 1.

The command generation unit 14 also generates the position command on the basis of a cutting condition 12 and outputs the position command to a position control unit 15. The position control unit 15 controls the position of the motor 19 on the basis of the position command and outputs a speed command to a speed control unit 16. On the basis of the speed command, the speed control unit 16 generates a torque command for controlling the speed of the motor 19 and outputs the torque command to a current control unit 18.

The friction compensation unit 17 estimates a friction force produced at the feed drive mechanism, generates a correction torque command from the estimated friction force, and outputs the correction torque command to the current control unit 18. The current control unit 18 generates a current command on the basis of the torque command and the correction torque command, to output the generated current command to the motor 19. The motor 19 is driven by the current command.

The cutting condition 12 here is a combination of conditions such as the shape of the tool 10, the material of the tool 10, the shape of the workpiece 11, the material of the workpiece 11, and machining paths, a cutting speed for each machining path, a feeding speed therefor, an axial depth ap of cut therefor and a radial depth of cut therefor. The cutting condition 12 may include a condition other than listed above. The cutting condition 12 may be a part of the conditions listed above.

The detection unit 4 will be described. The machine tool 1 outputs the feed drive mechanism state and sensor signals to the detection unit 4. To the control unit 9 and the countermeasure determination unit 7, the detection unit 4 outputs the feed drive mechanism state of the machine tool 1 and measurement signals which include information on the cutting force generated in the machine tool 1.

In a case where the sensor 3 is a force sensor, the detection unit 4 outputs time-series waveform signals, as its measurement signals. In a case where the sensor 3 is an acceleration sensor, a speed sensor or a displacement sensor, the detection unit 4 may include a cutting force observer, to output a cutting force estimated by the cutting force observer as the measurement signal. For example, the cutting force observer is expressed as Formula (1).

[Formula 1]

$$F_{cut} = r \times K \times 1 - M \times a - F_{fric} \quad (1)$$

In Formula (1), $F_{cut}$ is an estimated cutting force; r is a conversion coefficient for converting a force from a rotation direction to a linear motion direction; K is a torque constant; I is a current; M is a feed drive mechanism mass; a is a feed drive mechanism acceleration; and $F_{fric}$ is a friction force. The friction force $F_{fric}$ is a friction force generated at a sliding portion of the mechanical component.

The mechanical component is a bearing, for example. In Formula (1), an example of an observer for a single inertial mass is shown. In a case where the feed drive mechanism includes a plurality of inertial masses, an observer for the plurality of inertial masses may be used.

Next, the dynamic-characteristics-information storage unit 5 will be described. The dynamic-characteristics-information storage unit 5 internally stores dynamic characteristics information corresponding to the cutting condition 12 and outputs the dynamic characteristics information to the countermeasure determination unit 7. The dynamic characteristics information is information used for calculating a relative displacement amount between the tool 10 in a cutting process and the workpiece 11. The dynamic characteristics information changes, depending on the cutting condition 12 and the feed drive mechanism state that are obtained at the time of acquiring the dynamic characteristics information.

To be more specific, the dynamic characteristics information includes dynamic compliance of the system consisting of the tool 10 and the workpiece 11. The dynamic characteristics information possibly includes a combination of mass equivalent to the tool 10 and the workpiece 11, a damping factor equivalent thereto, and a spring constant equivalent thereto. The dynamic characteristics information may be obtained by an experiment in advance or calculated by a finite element analysis or the like.

Next, the machining-process-information storage unit 6 will be described. The machining-process-information storage unit 6 internally stores machining process information in association with the cutting condition 12 and outputs the information to the countermeasure determination unit 7. The machining process information is information used for calculating a cutting force generated between the tool 10 and the workpiece 11 when the tool 10 cuts the workpiece 11. The machining process information may be a measured value obtained in an experiment or a calculated value by using a finite element analysis or the like.

An example of the machining process information will be described below. The machining process information is a combination of specific cutting forces and edge forces that are used for calculating cutting forces by using Formula (2) to Formula (4). The edge forces are cutting forces when the tool cutting amount is zero.

[Formula 2]

$$F_t = K_{ct} \times A_c + K_{et} \quad (2)$$

[Formula 3]

$$F_t = K_{ct} \times A_c + K_{et} \quad (3)$$

[Formula 4]

$$F_z = K_{cz} \times A_c + K_{ez} \quad (4)$$

In Formula (2) to Formula (4), $F_t$, $F_r$ and $F_z$ are a cutting force in the tool rotation direction, a cutting force in the tool radius direction, and a cutting force in the tool axial direction, respectively. $K_{ct}$, $K_{cr}$ and $K_{cz}$ are a specific cutting force in the tool rotation direction, a specific cutting force in the tool radius direction, and a specific cutting force in the tool axial direction, respectively. $K_{et}$, $K_{er}$ and $K_{ez}$ are an edge force in the tool rotation direction, an edge force in the tool radius direction, and an edge force in the tool axial direction, respectively. Ac is a cutting cross sectional area. The cutting cross sectional area Ac changes from moment to moment depending on the tool rotation angle.

Next, the countermeasure determination unit 7 will be described. The countermeasure determination unit 7 obtains dynamic characteristics information outputted from the dynamic-characteristics-information storage unit 5, machining process information outputted from the machining-process-information storage unit 6, cutting conditions 12 outputted from the control unit 9, measurement signals outputted from the detection unit 4, and a feed drive mechanism state outputted therefrom.

From the cutting forces and the feed drive mechanism state, the countermeasure determination unit 7 determines whether a machining defect has occurred. In order to determine the occurrence of a machining defect, the countermeasure determination unit 7 has set a vibration threshold or a trajectory error threshold in advance. The countermeasure determination unit 7 compares the threshold and the measurement signal, and determines that a machining defect has occurred when the measurement signal exceeds the threshold.

The countermeasure determination unit 7 may convert the measurement signals being time-series waveforms into components of the frequency domain; and in a case where a vibration component exceeding the threshold exists in the frequency domain, the countermeasure determination unit may determine that a machining defect has occurred. The threshold may be changed according to the type of the cutting condition 12.

The following are concrete examples. The countermeasure determination unit 7, for example, compares the vibration amplitude of the measurement signal with the vibration threshold. For another example, the countermeasure determination unit 7 may compare a trajectory error obtained from the feed drive mechanism state with the trajectory error threshold.

Also, the countermeasure determination unit 7 may calculate the actual machining path from the feed drive mechanism; and in a case where the trajectory error between the commanded machining path specified by a cutting condition and the actual machining path exceeds the trajectory error threshold, the countermeasure determination unit may determine that a machining defect has occurred. The actual machining path is a trajectory along which the tool actually moved. The commanded machining path is a trajectory specified for the tool in the cutting condition.

In a case where on the basis of the measurement signal or the feed drive mechanism state the countermeasure determination unit determines that a machining defect has occurred, the countermeasure determination unit 7 calculates respective deviation degrees for the machining defect causes. Specifically, the countermeasure determination unit 7 calculates a deviation degree D1 for self-excited-chatter-vibration, a deviation degree D2 for forced chatter vibration, a deviation degree D3 for tool deflection, a deviation degree D4 for tool wear, and a deviation degree D5 for friction in feed drive mechanism.

It is suitable that the deviation degree expresses a difference between a reference machining state and a machining state at the time when detecting a machining defect and expresses the degree of deviation from the reference machining state. Formula (5) is an example of the deviation degree.

[Formula 5]

$$D_n = \frac{|X_n - A_n|}{|B_n - A_n|} \quad (5)$$

$(n = 1, \ldots, 5)$

Indexes n correspond to individual machining defect causes; n=1 indicates self-excited chatter vibration; n=2, forced chatter vibration; n=3, tool deflection; n=4, tool wear; and n=5, friction in feed drive mechanism.

Machining state variables Xn represent different kind of quantities corresponding to the machining defect causes. The machining state variables Xn are a spindle rotation speed for self-excited chatter vibration, a spindle rotation speed for forced chatter vibration, a radial depth of cut for tool deflection, a feeding speed for tool wear, and a friction correction amount for friction in feed drive mechanism. Note, however, machining state variables corresponding to the respective machining defect causes are not limited to those listed above.

An is a machining state variable reference which represents a reference value of machining state variable for performing stable machining without a machining defect. Bn is a machining state variable limit which represents a machining state variable at which it is impossible to realize a machining operation specified in the cutting condition. Machining state variable references An and machining state variable limits Bn represent different kinds of quantities corresponding to the machining defect-cause indexes n. The machining state variable references An and the machining state variable limits Bn each are a spindle rotation speed for self-excited chatter vibration, a spindle rotation speed for forced chatter vibration, a radial depth of cut for tool deflection, a feeding speed for tool wear, and a friction correction amount for friction in feed drive mechanism. Note that machining state variables corresponding to machining defect causes are not limited to those listed above.

The countermeasure determination unit 7 chooses the largest deviation degree from among the self-excited-chatter-vibration deviation degree D1 to the friction deviation degree D5 in feed drive mechanism and chooses a machining defect cause corresponding to the chosen largest deviation degree, thereby determining the machining defect cause as a countermeasure signal.

Next, the correction-amount calculation unit 8 will be described. The correction-amount calculation unit 8 receives the countermeasure signal outputted from the countermeasure determination unit 7, to calculate a correction amount according to the machining defect cause determined by the countermeasure determination unit 7, and then outputs the correction amount to the control unit 9. The correction amount is an amount for correcting the control amount calculated by the control unit 9. The control amount is a state amount of the machine tool 1 that is controlled by the control unit 9 to perform machining on the basis of the cutting condition.

For example, in a case where the countermeasure determination unit 7 outputs a countermeasure signal indicating that a machining defect is caused by self-excited chatter vibration or forced chatter vibration, a correction amount for the spindle rotation speed is calculated.

Because self-excited chatter vibration and forced chatter vibration are different machining defect defects, the correction amount of the spindle rotation speed for self-excited chatter vibration does not necessarily agree with that for forced chatter vibration.

In a case where the countermeasure determination unit 7 outputs a countermeasure signal indicating that a machining defect is caused by tool deflection, the correction-amount calculation unit 8 calculates a correction amount for the radial depth of cut.

In a case where the countermeasure determination unit 7 outputs a countermeasure signal indicating that a machining defect is caused by tool wear, the correction-amount calculation unit 8 calculates a correction amount for the feeding speed being a control amount, or generates a tool replacement command. In a case where the countermeasure determination unit 7 outputs a countermeasure signal indicating that a machining defect is caused by friction in feed drive mechanism, the correction-amount calculation unit 8 calculates a correction amount for the correction torque command.

Next, the control unit 9 will be described. The control unit 9 obtains the feed drive mechanism state from the detection unit 4 and controls, according to a cutting condition set in advance within the control unit 9, the operation of the motor 19 provided to the feed drive mechanism of the machine tool 1. When a correction amount is received from the correction-amount calculation unit 8, the control unit 9 corrects the control amount.

Also, the control unit 9 outputs the internally-set cutting condition 12 to the countermeasure determination unit 7.

Figure 3:
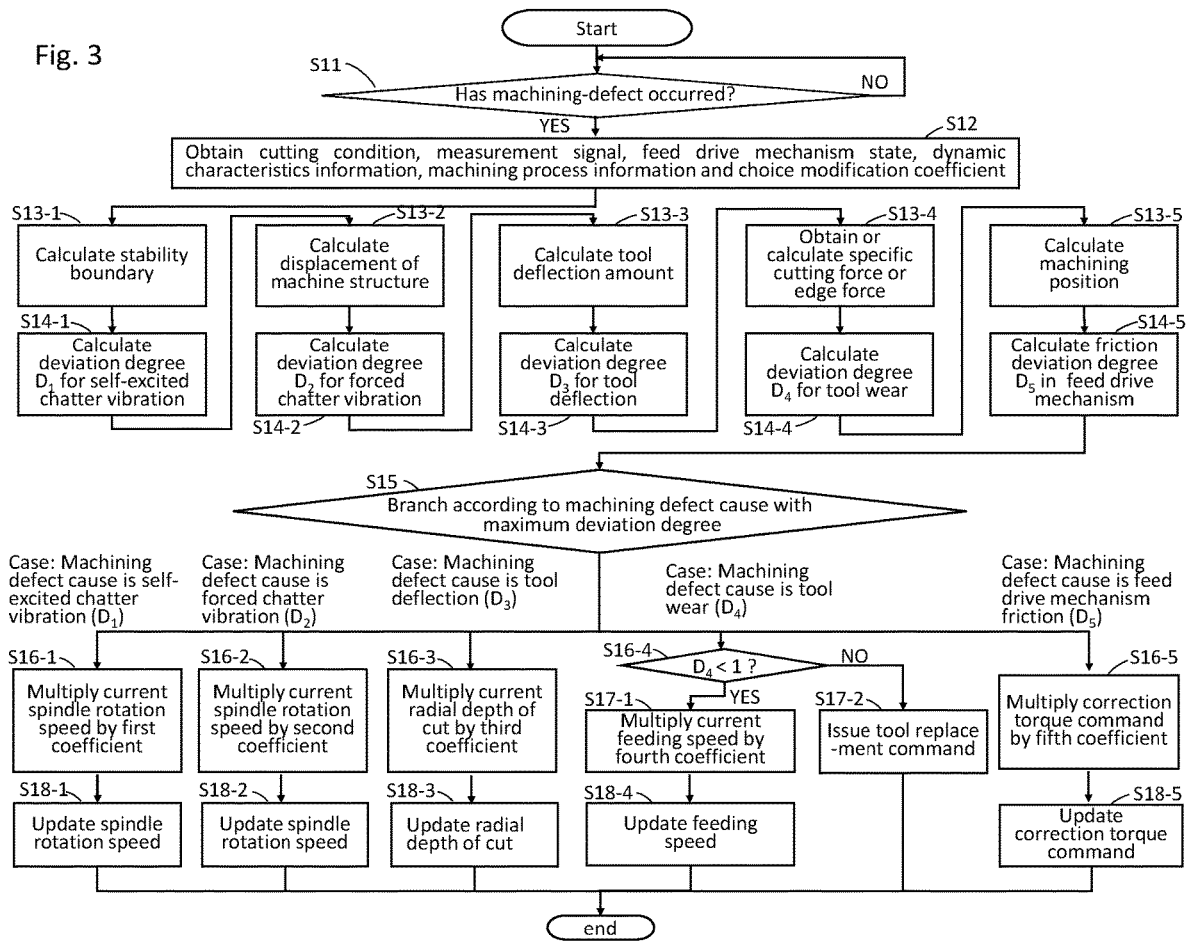
FIG. 3 is a flow chart showing the processing of the numerical control system according to Embodiment 1 of the present invention.

FIG. 3 is a flow chart showing the processing of the numerical control system 2 according to Embodiment 1 of the present invention. In FIG. 3, a series of processing performed by the numerical control system 2 is shown in a flowchart. With reference to FIG. 3, the processing of the numerical control system 2 will be described.

In step S11, on the basis of the measurement signal and feed drive mechanism state which are obtained from the detection unit 4 and the cutting condition 12, the countermeasure determination unit 7 determines whether or not a machining defect has occurred.

In a case where it is determined that a machining defect has occurred (determined as YES in S11), the countermeasure determination unit 7 proceeds to step S12. In a case where it is determined that a machining defect has not occurred (determined as NO in S11), the countermeasure determination unit 7 performs step S11 again.

In step S12, the countermeasure determination unit 7 obtains the measurement signal, the feed drive mechanism state, and the cutting condition 12 from the control unit 9. Also, the countermeasure determination unit 7 obtains dynamic characteristics information from the dynamic-characteristics-information storage unit 5. Furthermore, the countermeasure determination unit 7 obtains machining process information from the machining-process-information storage unit 6.

In steps S13 and steps S14, the countermeasure determination unit 7 calculates deviation degrees for all the machining defect causes. Note here that step S13-1 to step S13-5 are collectively called as steps S13, and step S14-1 to step S14-5 are collectively called as steps S14.

The numerical control system 2 according to Embodiment 1 calculates all the deviation degrees in series. All the deviation degrees may be calculated in parallel. Also, the order of calculating the deviation degrees is not limited to the order shown in FIG. 3.

Figure 4:
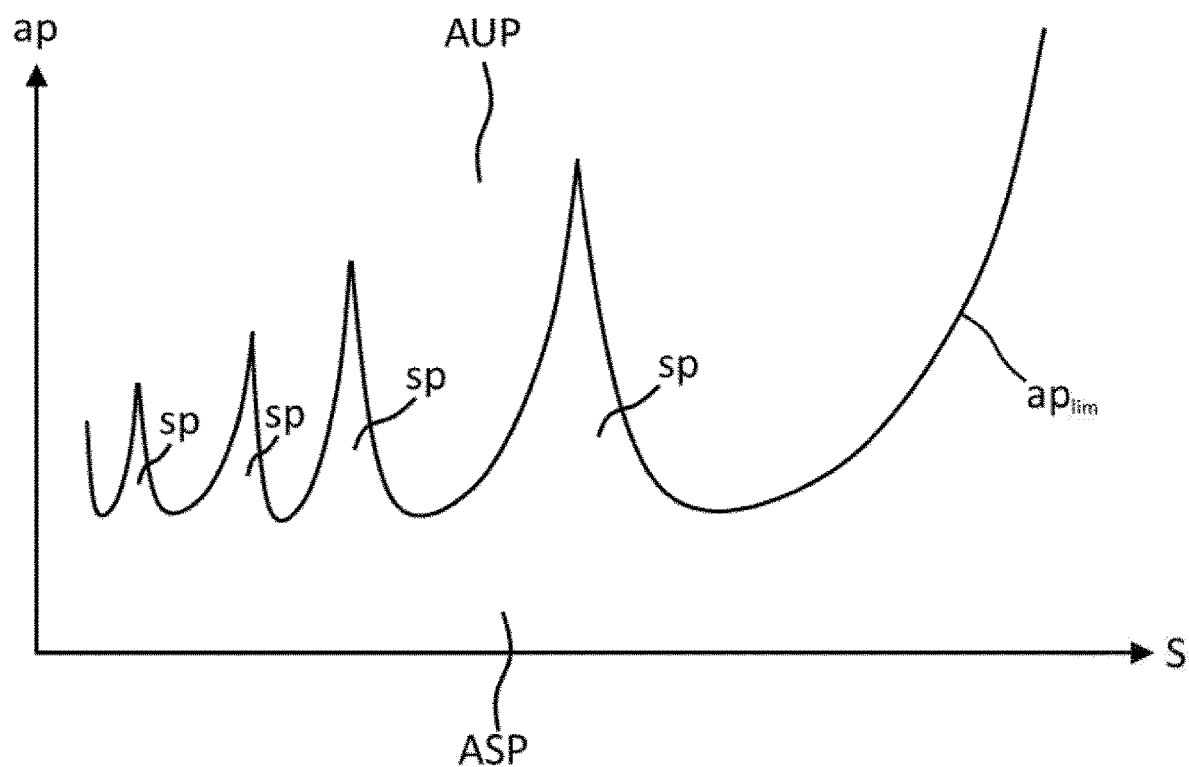
FIG. 4 is a stability limit graph according to Embodiment 1 of the present invention.

In step S13-1, the countermeasure determination unit 7 uses the measurement signal, the feed drive mechanism state, the cutting condition 12, the dynamic characteristics information, and the machining process information to calculate a stability boundary of self-excited chatter vibration. Next, description will be made about a stability boundary which is known by the technical document below. FIG. 4 shows a stability limit graph according to Embodiment 1 of the present invention (Non-patent document 1: Shamoto Eiji "Mechanism and Suppression of Chatter Vibrations in Cutting" DAIDO Steel Technical Journal, "DENKI-SEIKO", 2011, Vol. 82, No. 2).

The vertical axis in FIG. 4 shows axial depths ap of cut. The horizontal axis in FIG. 4 shows spindle rotation speeds S. In FIG. 4, the axial depth limit $ap_{lim}$ of cut indicates the boundary between a stable area ASP and an unstable area AUP. The axial depth limit $ap_{lim}$ of cut is the stability boundary for self-excited chatter vibration. Within the stable area ASP in FIG. 4, self-excited chatter vibration does not occur.

On the other hand, self-excited chatter vibration occurs within the unstable area AUP. In other words, if the axial depth ap of cut exceeds the axial depth limit $ap_{lim}$ of cut, self-excited chatter vibration occurs.

The axial depth limit $ap_{lim}$ of cut can be calculated by using a publicly-known method disclosed in Non-Patent Document 1. An example method for calculating the axial depth limit $ap_{lim}$ of cut is shown below. According to Non-Patent Document 1, the axial depth limit $ap_{lim}$ of cut can be calculated by using Formula (6), Formula (7) and Formula (8).

[Formula 6]

$$ap_{lim} = -\frac{\Lambda_R}{K_{ct}}\left(1 + \left(\frac{\Lambda_I}{\Lambda_R}\right)^2\right) \tag{6}$$

[Formula 7]

$$\varepsilon = \pi - 2\tan^{-1}\left(\frac{\Lambda_I}{\Lambda_R}\right) \tag{7}$$

[Formula 8]

$$S = \frac{60\omega_c}{N(2k\pi + \varepsilon)} \tag{8}$$

$$(k = 0, 1, 2 \ldots)$$

In Formula (8), $\omega_c$ is a chatter vibration frequency and N is the number of tool edges. $\Lambda_R$ and $\Lambda_I$ included in Formula (6) and Formula (7) are the real part and the imaginary part of $\Lambda$, respectively. $\Lambda$ can be obtained by solving the equation of Formula (9).

[Formula 9]

$$\det[[I]+\Lambda[A_0][G(i\omega_c)]]=0^* \tag{9}$$

In Formula (9), [I] is a unit matrix and i is an imaginary unit. $[A_0]$ is a cutting coefficient matrix. The cutting coefficient matrix $[A_0]$ is determined from the radial depth of cut, the tool rotation angle and the machining process information. The radial depth of cut, the tool rotation angle and the machining process information can be calculated from the cutting condition 12.

$[G(i\omega_c)]$ is a dynamic characteristics matrix at a chatter vibration frequency $\omega_e$, which is the dynamic compliance obtained from its dynamic characteristics information and is expressed in a transfer function. The dynamic characteristics matrix $[G(i\omega_c)]$ may be calculated as a transfer function of a secondary vibration system by using an equivalent mass, equivalent damping factor, and equivalent spring constant included in the dynamic characteristics information.

The axial depth limit $ap_{lim}$ of cut varies unevenly as the spindle rotation speed S changes; upwardly convex portions are called as stable pockets sp. In the stable pockets sp, the spindle rotation speed S is stable compared with that in areas outside the stable pockets.

Figure 5:
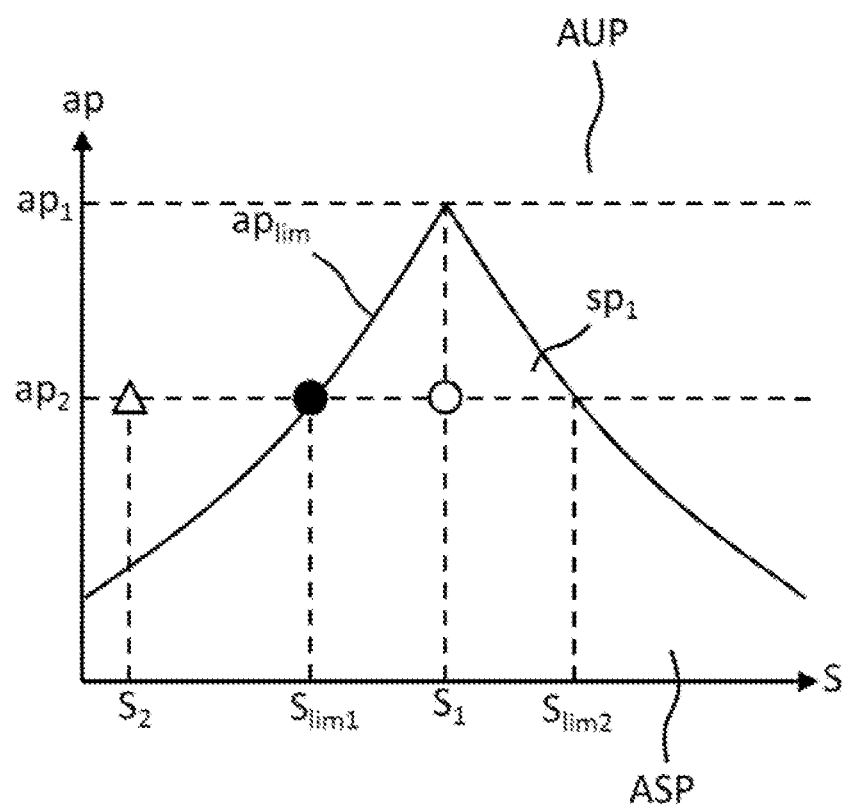
FIG. 5 is an enlarged graph of a part of the stability limit graph according to Embodiment 1 of the present invention.
Figure 6:
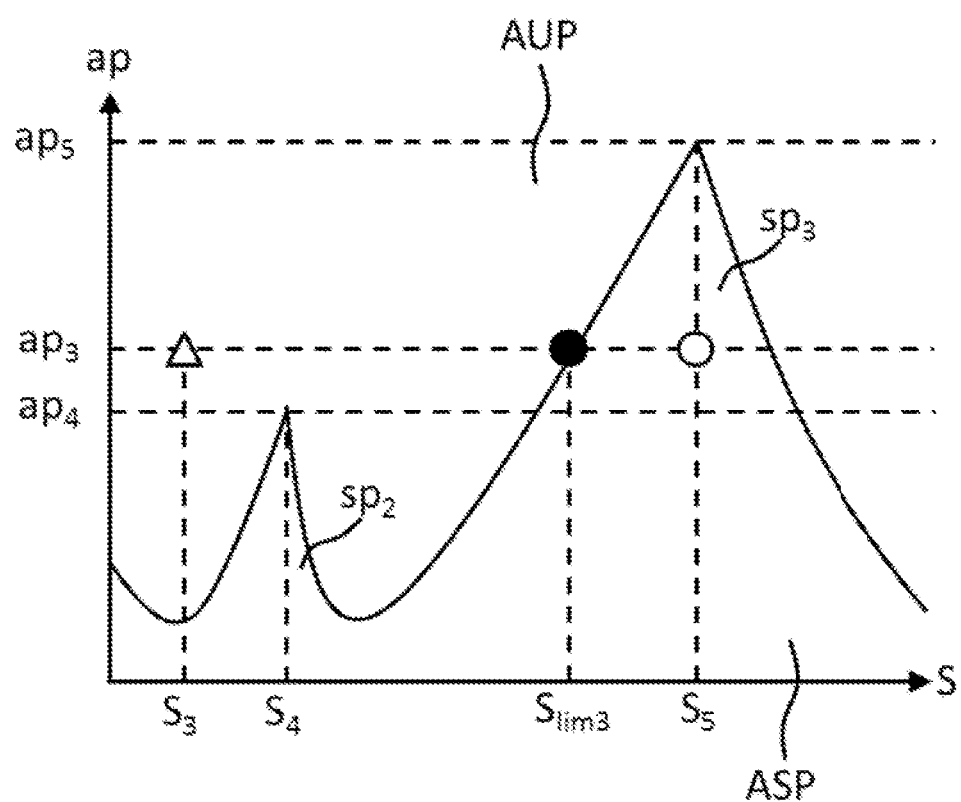
FIG. 6 is an enlarged graph of a part of the stability limit graph according to Embodiment 1 of the present invention.

Each of FIG. 5 and FIG. 6 is an enlarged graph of a part of the stability limit graph of Embodiment 1 of the present invention. In FIG. 5, a stable pocket $sp_1$ is shown. In FIG. 6, a stable pocket $sp_2$ and a stable pocket $sp_3$ are shown. In step S14-1, the countermeasure determination unit 7 calculates a deviation degree for self-excited chatter vibration.

A method for calculating a deviation degree $D_1$ for self-excited chatter vibration will be described using FIG. 5. A spindle rotation speed $S_1$ is the spindle rotation speed corresponding to the peak of the stable pocket $sp_1$. A spindle rotation speed $S_2$ is the spindle rotation speed at the time when detecting a machining defect. An axial depth $ap_2$ of cut is the axial depth of cut corresponding to the spindle rotation speed $S_2$. A spindle rotation speed limit $S_{lim1}$ is a spindle rotation speed on the stability boundary whose vertical axis value corresponds to the axial depth $ap_2$ of cut. A spindle rotation speed limit $S_{lim2}$ is another spindle rotation speed on the stability boundary whose vertical axis value corresponds to the axial depth $ap_2$ of cut.

When the spindle rotation speed obtained in step S12 is $S_2$ shown in FIG. 5, the countermeasure determination unit 7 is able to calculate a deviation degree $D_1$ for self-excited chatter vibration by setting, in Formula (5), the spindle rotation speed $S_1$ and the spindle rotation speed limit $S_{lim1}$ to the machining state variable reference $A_1$ and the machining state variable limit $B_1$, respectively.

Next, description will be made about a method for calculating a deviation degree in a case where the stability limit and the spindle rotation speed at the time when a machining defect is detected are in a state shown in FIG. 6. A spindle rotation speed $S_3$ is the spindle rotation speed at the time when a machining defect is detected. A spindle rotation speed $S_4$ is the spindle rotation speed corresponding to the peak of a stable pocket $sp_2$. A spindle rotation speed $S_5$ is the spindle rotation speed corresponding to the peak of a stable pocket $sp_3$. An axial depth $ap_3$ of cut is the axial depth of cut corresponding to the spindle rotation speed $S_3$. An axial depth $ap_4$ of cut is the axial depth of cut corresponding to the spindle rotation speed $S_4$. An axial depth $ap_5$ of cut is the axial depth of cut corresponding to the spindle rotation speed $S_5$. A spindle rotation speed limit $S_{lim3}$ is the spindle rotation speed on the stability boundary corresponding to the axial depth $ap_5$ of cut. In FIG. 6, the axial depth $ap_4$ of cut is smaller than the axial depth $ap_3$ of cut, and the axial depth $ap_5$ of cut is larger than the axial depth $ap_3$ of cut. Therefore, the countermeasure determination unit 7 cannot find a way from the axial depth $ap_3$ of cut to reach the stable pocket $sp_2$ just by changing the spindle rotation speed.

In such a case, as shown in FIG. 6, the countermeasure determination unit 7 chooses a stable pocket whose peak position corresponds to a spindle rotation speed that is the closest to the spindle rotation speed $S_3$ from among stable pockets whose axial depth $ap_5$ of cut is larger than the axial depth $ap_3$ of cut. In a situation such as that shown in FIG. 6, the countermeasure determination unit 7 calculates a deviation degree $D_1$ for self-excited chatter vibration with respect to a stable pocket $sp_3$ that is the closest to the spindle rotation speed $S_3$.

That is, in a situation shown in FIG. 6, the countermeasure determination unit 7 sets, in Formula (5), the spindle rotation speed $S_3$ into the machining state variable $X_1$ of self-excited chatter vibration at the time when detecting a machining defect. Then, the countermeasure determination unit 7 sets the spindle rotation speed $S_5$ to the machining state variable reference $A_1$, and sets the spindle rotation speed limit $S_{lim3}$ to the machining state variable limit $B_1$ to calculate a deviation degree $D_1$ for self-excited chatter vibration.

In a case of FIG. 5, since the machining state variable limit $B_1$ is the spindle rotation speed limit $S_{lim1}$, a spindle rotation speed S smaller than the spindle rotation speed limit $S_{lim1}$ produces self-excited chatter vibrations and the self-excited-chatter-vibration deviation degree $D_1$ becomes larger than one. In a case where the spindle rotation speed S is larger than the spindle rotation speed limit $S_{lim1}$, the deviation degree $D_1$ for self-excited chatter vibration becomes smaller than one. That is, when the deviation degree D1 for self-excited chatter vibration is larger than one, there occur self-excited chatter vibrations being the machining defect cause.

In step S13-2, the countermeasure determination unit 7 calculates a force-displacement response of the machine structure by using the measurement signal and the dynamic characteristics information. To be more specific, the countermeasure determination unit 7 calculates displacements in the machine structure in the frequency domain from the product of the cutting force obtained from the measurement signal and the dynamic compliance obtained from the dynamic characteristics information.

In a case where the machining state variable $X_2$ of forced chatter vibration at the time when defecting a machining defect equals the machining state variable reference $A_2$ of forced chatter vibration, the forced-chatter-vibration deviation degree $D_2$ becomes zero. In a case where the machining state variable $X_2$ of forced chatter vibration at the time when detecting a machining defect equals the machining state variable limit $B_2$, the forced-chatter-vibration deviation degree $D_2$ becomes one. The larger the difference between the machining state variable $X_2$ of forced chatter vibration at the time when detecting a machining defect and the machining state variable reference $A_2$ is, the larger the forced-chatter-vibration deviation degree $D_2$ becomes. The larger the difference between the machining state variable limit $B_2$ and the machining state variable reference $A_2$ is, the smaller the forced-chatter-vibration deviation degree $D_2$ becomes. The forced-chatter-vibration deviation degree $D_2$ is calculated using, as a reference, the difference between the machining state variable reference $A_2$ and the machining state variable limit $B_2$, so as to indicate an amount of the machine structure displacement at the time when detecting a machining defect.

In step S13-3, from the cutting condition 12, the feed drive mechanism state, the dynamic characteristics information and the machining process information, the countermeasure determination unit 7 calculates a relationship of a radial depth of cut and a tool deflection amount. The countermeasure determination unit 7 calculates tool deflection amounts at moments during one rotation of the tool 10 by using Formula (10) and obtains the maximum tool deflection amount during the one rotation of the tool 10 as a tool deflection amount δ corresponding to the radial depth of cut. Formula (10) is a calculation formula for the tool deflection amount δ.

[Formula 10]

$$\delta = \frac{F_r \times l^3}{3 \times E \times I_t} \quad (10)$$

In Formula (10), δ is a tool deflection amount; $F_r$ is a cutting force in the tool radius direction; l is a tool projection length; E is the Young's modulus of the tool; and $I_t$ is the secondary moment of the tool's cross section. The cutting force in the tool radius direction $F_r$ can be calculated from Formula (3), using the machining process information and the cutting condition 12. While the tool makes one rotation, the cutting force in the tool radius direction $F_r$ changes according to the cutting cross sectional area $A_c$.

The tool projection length l and the Young's modulus E of the tool can be obtained from the cutting condition 12. The secondary moment $I_t$ of the tool's cross section can be calculated from the tool shape. The secondary moment $I_t$ of the tool's cross section may be calculated from Formula (11) by assuming the tool's cross section to be a circle with its diameter d. Also, the secondary moment $I_t$ of the tool's cross section may be calculated by performing finite element analysis on the shape of the tool 10.

[Formula 11]

$$I_t = \frac{\pi \times d^4}{64} \quad (11)$$

Without using Formula (11) in step S13-3, the countermeasure determination unit 7 may calculate dynamic deflections of the tool, using a motion equation of a cantilever under an assumption that the tool 10 is a continuum. In this case, the countermeasure determination unit 7 adopts, for the tool deflection amount δ, a solution having the maximum value among those of the solutions obtained from the motion equation for a period during which the tool 10 rotates a predetermined number of times.

In step S14-3, the countermeasure determination unit 7 calculates a tool-deflection deviation degree $D_3$ on the basis of Formula (5). When calculating a tool-deflection deviation degree $D_3$, the countermeasure determination unit 7 sets in Formula (5), the tool deflection amount δ in the radial depth of cut at the time when detecting a machining defect, to the machining state variable $X_3$ of the tool deflection at the time when detecting a machining defect; also, for the calculation, the countermeasure determination unit 7 sets in Formula (5), zero (indicating a state of no tool deflection) and a tool-deflection amount limit $\delta_{lim}$, to the machining state variable reference $A_3$ and the machining state variable limit $B_3$, respectively. Here, the tool-deflection amount limit $\delta_{lim}$ is the maximum tool deflection amount with which the workpiece 11 can be machined into dimensions within desired accuracies.

When calculating a tool-deflection deviation degree $D_3$ by the calculation method described above, the tool-deflection deviation degree $D_3$ has following characteristics. In a case where the machining state variable $X_3$ of tool deflection at the time when defecting a machining defect equals the machining state variable reference $A_3$, the tool-deflection deviation degree $D_3$ becomes zero. In a case where the machining state variable $X_3$ of tool deflection at the time when detecting a machining defect equals the machining state variable limit $B_3$ of tool deflection, the tool-deflection deviation degree $D_3$ becomes one.

The larger the difference between the machining state variable $X_3$ of tool deflection at the time when detecting a machining defect and the machining state variable reference $A_3$ of tool deflection is, the larger the tool-deflection deviation degree $D_3$ becomes. The larger the difference between the machining state variable limit $B_3$ of tool deflection and the machining state variable reference $A_3$ of tool deflection is, the smaller the tool-deflection deviation degree $D_3$ becomes.

In other words, the tool-deflection deviation degree $D_3$ expresses the difference between the machining state variable $X_3$ of tool deflection at the time when detecting a machining defect and the machining state variable reference $A_3$ of tool deflection, with reference to the difference between the machining state variable limit $B_3$ of tool deflection and the machining state variable reference $A_3$ of tool deflection.

In step S13-4, the countermeasure determination unit 7 obtains the specific cutting force $K_{ct}$ in the tool rotation direction at the time when detecting a machining defect or the edge force $K_{et}$ in the tool rotation direction at the time when detecting a machining defect, from the machining process information. For another example to obtain $K_{ct}$ and $K_{et}$, the countermeasure determination unit 7 may store in advance a specific cutting force $K_{ct}$ in the tool rotation direction and an edge force $K_{et}$ in the tool rotation direction, the forces being in a condition of no tool wear, and then use Formula (12) and Formula (13) to calculate the specific cutting force $K_{ct}$ in the tool rotation direction and the edge force $K_{et}$ in the tool rotation direction according to the tool usage time.

[Formula 12]

$$K_{ct} = \alpha \times t^n \times K_{ct0} \quad (12)$$

[Formula 13]

$$K_{et} = \beta \times t^n \times K_{et0} \quad (13)$$

In Formula (12) and Formula (13), α and β are weighting coefficients; t is a tool usage time; n is order representing a wear progression level; $K_{ct0}$ is a specific cutting force in the tool rotation direction in a state where the tool does not wear; and $K_{et0}$ is an edge force in the tool rotation direction in a state where the tool does not wear. The countermeasure determination unit 7 obtains or calculates specific cutting forces and edge forces in the tool radius direction and the tool axial direction by using the same method as described above.

In step S14-4, the countermeasure determination unit 7 calculates a tool-wear deviation degree $D_4$ on the basis of Formula (5). To be specific, the countermeasure determination unit 7 perform calculation of Formula (5) with respect to each of the specific cutting force $K_{ct}$ in the tool rotation direction, the specific cutting force $K_{cr}$ in the tool radius direction and the specific cutting force $K_{cz}$ in the tool axial direction, to adopt the largest degree out of those in all directions for the tool-wear deviation degree $D_4$.

Instead, the countermeasure determination unit 7 may perform calculation of Formula (5) with respect to each of the edge force $K_{et}$ in the tool rotation direction, the edge force $K_{er}$ in the tool radius direction and the edge force $K_{ez}$ in the tool axial direction, to adopt the largest degree out of those in all directions as the tool-wear deviation degree $D_4$. For example, in the case where the specific cutting force $K_{ct}$ in the tool rotation direction is the largest specific cutting force among those in all directions, in Formula (5) the countermeasure determination unit 7 sets the specific cutting force $K_{ct}$ in the tool rotation direction, the specific cutting force $K_{ct0}$ in the tool rotation direction in a state without tool wear, and the specific cutting force limit $K_{ct}$ in the tool rotation direction, into $X_4$, the machining state variable reference $A_4$ of tool wear, and the machining state variable limit $B_4$ of tool wear, respectively, to calculate the tool-wear deviation degree $D_4$.

For another example, in a case where the edge force $K_{et}$ in the tool rotation direction is the largest edge force among those in all directions, in Formula (5) the countermeasure determination unit 7 sets the edge force $K_{et}$ in the tool rotation direction, the edge force $K_{et}$ in the tool rotation direction in a state without tool wear, and the edge force limit $K_{et}$ in the tool rotation direction, into the machining state variable $X_4$ of tool wear at the time when detecting a machining defect, the machining state variable reference $A_4$ of tool wear, and the machining state variable limit $B_4$ of tool wear, respectively, to calculate the tool-wear deviation degree $D_4$.

Because the countermeasure determination unit 7 calculates the tool-wear deviation degree $D_4$ as described above, in a case where the machining state variable $X_4$ of tool wear at the time when detecting a machining defect equals the machining state variable reference $A_4$ of tool wear, the tool-wear deviation degree $D_4$ becomes zero. Also, in a case where the machining state variable $X_4$ of tool wear at the time when detecting a machining defect equals the machining state variable limit $B_4$, the tool-wear deviation degree $D_4$ becomes one.

Also, the larger the difference between the machining state variable $X_4$ of tool wear at the time when detecting a machining defect and the machining state variable reference $A_4$ of tool wear is, the larger the tool-wear deviation degree $D_4$ becomes. Also, the larger the difference between the machining state variable limit $B_4$ of tool wear and the machining state variable reference $A_4$ of tool wear is, the smaller the tool-wear deviation degree $D_4$ becomes. In step S13-5, the countermeasure determination unit 7 calculates a machining position of the machine tool 1 from the feed drive mechanism state.

In step S14-5, the countermeasure determination unit 7 calculates a friction deviation degree $D_5$ in feed drive mechanism on the basis of Formula (5). In Formula (5), the countermeasure determination unit 7 sets the machining position at the time when detecting a machining defect (calculated in step S13-5), the machining position specified in the cutting condition, and the machining position limit, into the machining state variable $X_5$ of the friction in feed drive mechanism at the time when detecting a machining defect, the machining state variable reference $A_5$ of the friction in feed drive mechanism, and the machining state variable limit $B_5$ of the friction in feed drive mechanism, respectively. Here, the machining position limit is a machining position at which the trajectory error becomes its maximum.

Because the friction deviation degree $D_5$ in feed drive mechanism is calculated as described above, in a case where the machining state variable $X_5$ of the friction in feed drive mechanism at the time when detecting a machining defect equals the machining state variable reference $A_5$ of the friction in feed drive mechanism, the friction deviation degree $D_5$ in feed drive mechanism becomes zero. Also, in a case where the machining state variable $X_5$ of the friction in feed drive mechanism at the time when detecting a machining defect equals the machining state variable limit $B_5$ of the friction in feed drive mechanism, the friction deviation degree $D_5$ in feed drive mechanism becomes one.

Also, the larger the difference between the machining state variable $X_5$ of the friction in feed drive mechanism at the time when detecting a machining defect and the machining state variable reference $A_5$ of the friction in feed drive mechanism is, the larger the friction deviation degree $D_5$ in feed drive mechanism becomes. Further, the larger the difference between the machining state variable limit $B_5$ of the friction in feed drive mechanism and the machining state variable reference $A_5$ of the friction in feed drive mechanism is, the smaller the friction deviation degree $D_5$ in feed drive mechanism becomes.

In step S15, the countermeasure determination unit 7 compares the degrees from the self-excited-chatter-vibration deviation degree $D_1$ to the friction deviation degree $D_5$ in feed drive mechanism, which have been calculated in step S14-1 to step S14-5, and chooses the largest deviation degree thereamong. The countermeasure determination unit 7 outputs "a machining defect cause" corresponding to the largest deviation degree, as a countermeasure signal, to the correction-amount calculation unit 8.

In steps S16, the correction-amount calculation unit 8 calculates a correction amount for avoiding the machining defect.

In the case where the countermeasure determination unit 7 outputs "self-excited chatter vibration" as the machining defect cause, the correction-amount calculation unit 8 calculates in step S16-1 a correction amount obtained by multiplying the spindle rotation speed $S_2$ by a first coefficient. In step S18-1, the control unit 9 updates the spindle rotation speed according to the correction amount calculated in step S16-1.

In the case where the countermeasure determination unit 7 outputs "forced chatter vibration" as the machining defect cause, the correction-amount calculation unit 8 calculates in step S16-2 a correction amount obtained by multiplying the spindle rotation speed $S_2$ by a second coefficient. In step S18-2, the control unit 9 updates the spindle rotation speed according to the correction amount calculated in step S16-2.

In the case where the countermeasure determination unit 7 outputs "tool deflection", the correction-amount calculation unit 8 calculates in step S16-3 a correction amount obtained by multiplying the radial depth of cut at the time when detecting a machining defect by a third coefficient. In step S18-3, the control unit 9 updates the radial depth of cut according to the correction amount calculated in step S16-3.

In the case where the countermeasure determination unit 7 outputs "tool wear", the correction-amount calculation unit 8 determines in step S16-4 whether the tool-wear deviation degree $D_4$ is smaller than one. In the case when the tool-wear deviation degree $D_4$ is one or larger, the machining defect cause cannot be removed even if the feeding speed is changed. Therefore, the correction-amount calculation unit 8 outputs at step S17-2 a tool replacement command instead of the correction amount.

If the tool-wear deviation degree $D_4$ is smaller than one in step S16-4, the correction-amount calculation unit 8 calculates in step S17-1 a correction amount obtained by multiplying the feeding speed at the time when detecting a machining defect by a fourth coefficient. In step S18-4, the control unit 9 changes the feeding speed according to the correction amount calculated in step S17-1.

In the case where the countermeasure determination unit 7 outputs "friction in feed drive mechanism", the correction-amount calculation unit 8 calculates in step S16-5 a correction amount obtained by multiplying the correction torque command at the time when a machining defect is detected by a fifth coefficient. In step S18-5, the control unit 9 changes the correction torque command according to the correction amount calculated in step S16-5.

The first coefficient to the fifth coefficient used by the correction-amount calculation unit for calculating correction amounts can be determined by conducting machining experiments in advance. It is also possible to use a first coefficient to a fifth coefficient that are calculated from a cutting condition where no machining defect occurs.

Step S18-1 through step S18-5 are collectively referred to as steps S18. As so far described, in steps S18, the control unit 9 changes a control amount having been set therein, using the correction amount received from the correction-amount calculation unit 8. When the tool replacement command is outputted as a correction amount in step S17-2, a tool replacement instruction may be displayed for the worker.

As described above, in the numerical control system 2 according to Embodiment 1, the countermeasure determination unit 7 calculates the deviation degree $D_n$ (n is an integer of 1 to 5) when it determines that a machining defect has occurred. The cutting conditions, the cutting forces, the dynamic characteristics information, the machining process information and the feed drive mechanism are used for calculating the deviation degrees. Then, on the basis of the calculated deviation degrees, the cause of a machining defect having occurred is determined and the correction amount is calculated with respect to the determined machining defect cause.

Note, however, that the calculation formula used for the deviation degrees is not limited to Formula (5). For example, Formula (14) or Formula (15) may be used.

[Formula 14]

$$D_n = \frac{|X_n - A_n|^2}{|B_n - A_n|^2} \quad (14)$$

$(n = 1, \ldots, 5)$

[Formula 15]

$$D_n = \frac{e^{|X_n - A_n|}}{e^{|B_n - A_n|}} \quad (15)$$

$(n = 1, \ldots, 5)$

The absolute value of the difference between the machining state variable $X_n$ at the time when detecting a machining defect and the machining state variable reference $A_n$ indicates how far the machining state variable $X_n$ at the time when detecting a machining defect deviates from the machining state variable reference $A_n$ being a reference value. Therefore, it is suitable that a formula for calculating the deviation degrees gives a larger deviation degree as the absolute value of the difference between the machining state variable $X_n$ at the time when detecting a machining defect and the machining state variable reference $A_n$ becomes larger. It is also suitable that, in the characteristics of the calculation formula of the deviation degree, a larger difference between the machining state variable limit $B_n$ and the machining state variable reference $A_n$ gives a smaller deviation degree $D_n$.

In Embodiment 1, the machining defect cause is determined by choosing the largest of all the deviation degrees calculated. A deviation calculation formula such as Formula (16) may be used so that the smallest $D_n$ of all the deviation degrees will be chosen to determine the machining defect cause.

[Formula 16]

$$D_n = \frac{|B_n - A_n|^2}{|C_n - A_n|^2} \quad (16)$$

$(n = 1, \ldots, 5)$

In a case where a machining defect occurs, the numerical control system 2 according to Embodiment 1 can determine, more accurately than conventional numerical control systems, which cause is the main cause or which type of machining defect has occurred, out of the five types of machining defect including self-excited chatter vibration, forced chatter vibration, tool deflection, tool wear and friction in feed drive mechanism.

Also, because the numerical control system 2 according to Embodiment 1 is able to identify which machining defect has occurred, the kind of control for correction can be changed according to the kind of the machining defect cause. This makes it possible to avoid or reduce machining defects with respect to a plurality of kinds of machining defect cause.

The deviation degrees according to Embodiment 1 have the following characteristics in common. With respect to all of the deviation degree $D_n$ from n=1 to n=5, the deviation degree $D_n$ becomes zero in a case where the machining state variable $X_n$ at the time when detecting a machining defect equals the machining state variable reference $A_n$, and the deviation degree $D_n$ becomes one in a case where the machining state variable $X_n$ at the time when detecting a machining defect equals the machining state variable limit $B_n$.

Thus, using the difference between the machining state variable limit $B_n$ and the machining state variable reference $A_n$ as a reference scale, the deviation degree $D_n$ serves as a measurement value indicating quantitatively the deviation degree of the machining state variable $X_n$ at the time when detecting a machining defect from the machining state variable reference $A_n$.

By calculating the deviation degrees $D_n$ as described above, the difference between a machining state variable at the time when detecting a kind of machining defect and the machining state variable reference $A_n$ corresponding to the normal and possible operation can be compared quantitatively with the differences made in other kinds of machining defect. This makes it possible to determine more accurately which machining defect has occurred.

In the numerical control system 2 according to Embodiment 1, the countermeasure determination unit 7 chooses a machining defect cause from among self-excited chatter vibration, forced chatter vibration, tool deflection, tool wear and friction in feed drive mechanism. However, machining defect causes are not limited to these five kinds. Also, machining defect causes are not fixed to the five kinds, and the causes may be four or less, or six or more.

In the present embodiment 1, the machining defect cause is chosen based on the largest deviation degree; however, a plurality of machining defect causes may be chosen. For example, in addition to the machining defect cause corresponding to the largest deviation degree, the countermeasure determination unit 7 may also choose a machining defect cause corresponding to the second largest deviation degree, to make corrections for the plurality of machining defect causes.

The numerical control system 2 according to Embodiment 1 is configured to internally store the dynamic characteristics information and the machining process information; however, the dynamic characteristics information and the machining process information which are to be inputted to the countermeasure determination unit 7 may be stored outside the numerical control system 2. For example, the dynamic characteristics information, the machining process information, and the cutting condition may be stored in a database outside the numerical control system 2 so that the countermeasure determination unit 7 will obtain, via a communication means such as a telecommunication network, the dynamic characteristics information, the machining process information, and the cutting condition.

In Embodiment 1, description has been made about the numerical control system 2 that controls the machine tool 1 for cut machining; however, the application of the present invention is not limited to machine tools for cutting. The present invention can be applied to other kinds of machining such as cutting off, drilling, grinding, polishing, rolling, forging and bending. That is, in other kinds of machining, it is also possible to obtain a machining state variable and a deviation degree for each of their machining defect causes and compare the deviation amounts, to determine a machining defect cause.

Embodiment 2

In Embodiment 1, it has been described that after choosing a machining defect cause, the correction amount is calculated by multiplying the control amount corresponding to the machining defect cause by a coefficient. In the present embodiment 2, description will be made about a configuration in which the correction-amount calculation unit switches rules for changing the control according to the determination results on a machining defect cause.

Figure 7:
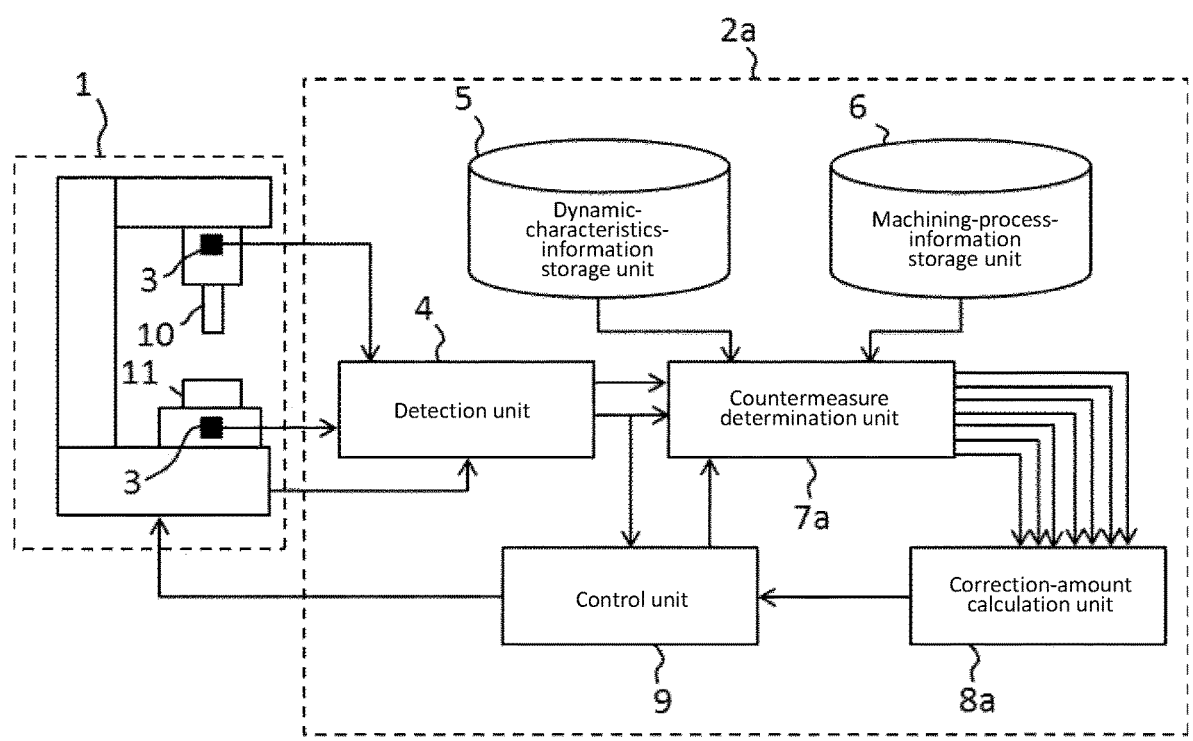
FIG. 7 is a block diagram of a numerical control system according to Embodiment 2 of the present invention.

FIG. 7 is a block diagram of a numerical control system according to Embodiment 2 of the present invention. Note that, in FIG. 7, components identical or equivalent to those of Embodiment 1 shown in FIG. 1 are given the same symbols. Here, description will be made focusing on parts characterizing the present embodiment 2.

In the same way as the countermeasure determination unit 7 according to Embodiment 1 does, a countermeasure determination unit 7a receives the feed drive mechanism state, the dynamic characteristics information and the machining process information to perform internal processing in the same way as the countermeasure determination unit 7 in Embodiment 1 does. The countermeasure determination unit 7a outputs "a machining defect cause" that is chosen internally by the countermeasure determination unit 7a, as a countermeasure signal, to a correction-amount calculation unit 8a, which will be described later.

In addition to the countermeasure signal, the countermeasure determination unit 7a outputs the dynamic characteristics information, the machining process information, the cutting condition, a feed drive mechanism state signal and the measurement signal to the correction-amount calculation unit 8a. The correction-amount calculation unit 8a receives the countermeasure signal from the countermeasure determination unit 7a, and then chooses a control rule according to the kind of the machining defect cause chosen by the countermeasure determination unit 7a, to output to the control unit 9 a correction amount calculated according to the chosen control rule.

Figure 8:
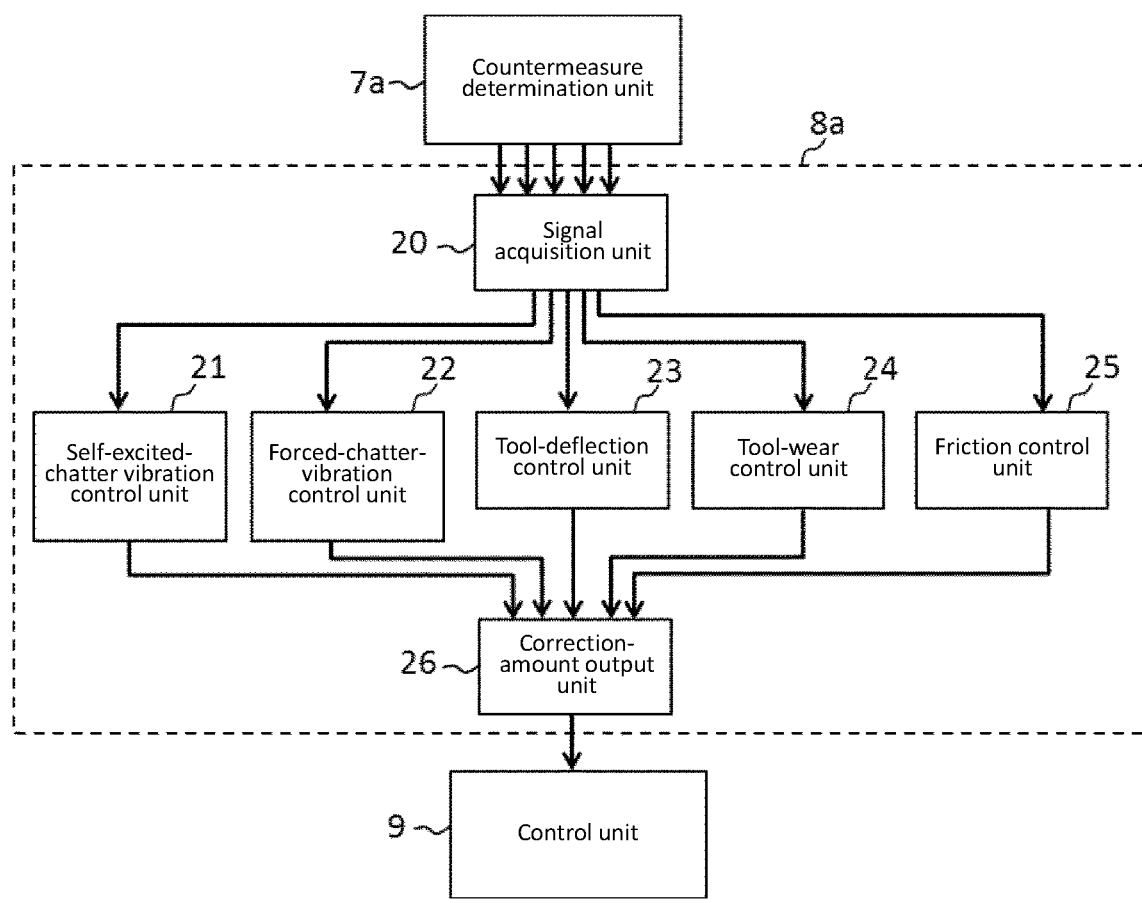
FIG. 8 is a block diagram of a correction-amount calculation unit of the numerical control system according to Embodiment 2 of the present invention.

FIG. 8 shows a block diagram of the correction-amount calculation unit 8a. In FIG. 8, the countermeasure determination unit 7a and the control unit 9 are shown in addition to the components of the correction-amount calculation unit 8a. The correction-amount calculation unit 8a includes a signal acquisition unit 20, a self-excited-chatter-vibration control unit 21, a forced-chatter-vibration control unit 22, a tool-deflection control unit 23, a tool-wear control unit 24, a friction control unit 25 and a correction-amount output unit 26.

The signal acquisition unit 20 receives the countermeasure signal and determines the machining defect cause chosen by the countermeasure determination unit 7a. In a case where it is determined that self-excited chatter vibration is the machining defect cause, the signal acquisition unit 20 outputs a countermeasure signal to the self-excited-chatter-vibration control unit 21.

In a case where it is determined that forced chatter vibration is the machining defect cause, the signal acquisition unit 20 outputs a countermeasure signal to the forced-chatter-vibration control unit 22. In a case where it is determined that tool deflection is the machining defect cause, the signal acquisition unit 20 outputs a countermeasure signal to the tool-deflection control unit 23.

In a case where it is determined that tool wear is the machining defect cause, the signal acquisition unit 20 outputs a countermeasure signal to the tool-wear control unit 24. In a case where it is determined that friction in feed drive mechanism is the machining defect cause, the signal acquisition unit 20 outputs a countermeasure signal to the friction control unit 25.

The self-excited-chatter-vibration control unit 21 uses the measurement signal, feed drive mechanism state signal, cutting condition, dynamic characteristics information and machining process information, to calculate a spindle rotation speed S and an axial depth ap of cut for suppressing self-excited chatter vibration.

To be more specific, the self-excited-chatter-vibration control unit 21 calculates a stability boundary of self-excited chatter vibration by using the method described in step S13-1 of Embodiment 1 and chooses a stable pocket sp which is the closest to the spindle rotation speed at the time when detecting a machining defect. Then, in the chosen stable pocket, the self-excited-chatter-vibration control unit 21 calculates, for correction amounts, the maximum axial depth ap of cut and the spindle rotation speed S corresponding to the calculated maximum axial depth ap of cut.

The forced-chatter-vibration control unit 22 uses the measurement signal, feed drive mechanism state signal, cutting condition, dynamic characteristics information and machining process information, to calculate a spindle rotation speed S for suppressing forced chatter vibration. To be more specific, the forced-chatter-vibration control unit calculates a machine-structure vibration displacement $|[G(i\omega)] \cdot [F(i\omega)]|$ from a dynamic characteristics matrix $[G(i\omega)]$ and a cutting vector $[F(i\omega)]$ at an arbitrary frequency $\omega$.

Then, the forced-chatter-vibration control unit 22 chooses a frequency $\omega_6$ at which the vibration displacement becomes smaller than the displacement limit, calculates the spindle rotation speed $S_6$ by using Formula (17), and outputs the calculated spindle rotation speed $S_6$ as the correction amount.

[Formula 17]

$$S_6 = \frac{30 \times \omega_6}{\pi} \quad (17)$$

The tool-deflection control unit 23 uses the cutting condition, feed drive mechanism state signal, dynamic characteristics information and machining process information, to calculate a spindle rotation speed S and a radial depth ae of cut for suppressing tool deflection. To be more specific, by using the method described in step S13-3 of Embodiment 1, the tool-deflection control unit 23 calculates tool deflections each corresponding to a combination of a spindle rotation speed Sand a radial depth ae of cut. Then, for the spindle rotation speed $S_7$ and the radial depth $ae_1$ of cut, the tool-deflection control unit 23 chooses combinations of the spindle rotation speed Sand the radial depth ae of cut, the combinations each giving a tool deflection amount smaller than the tool-deflection amount limit.

From among the chosen combinations, the tool-deflection control unit 23 finds out a combination which gives a maximum material removal rate MMR obtained from Formula (18), to output the combination as the correction amounts.

[Formula 18]

$$MMR = f \times N \times S_7 \times ap \times ae_1 \quad (18)$$

In the formula above, f is a feed amount per one cutting edge, N is the number of tool edges, $S_7$ is a spindle rotation speed, ap is an axial depth of cut, and $ae_1$ is a radial depth of cut. Note that the combination of the spindle rotation speed S and the radial depth ae of cut that give the maximum material removal rate may be searched by numerical simulations.

Figure 9:
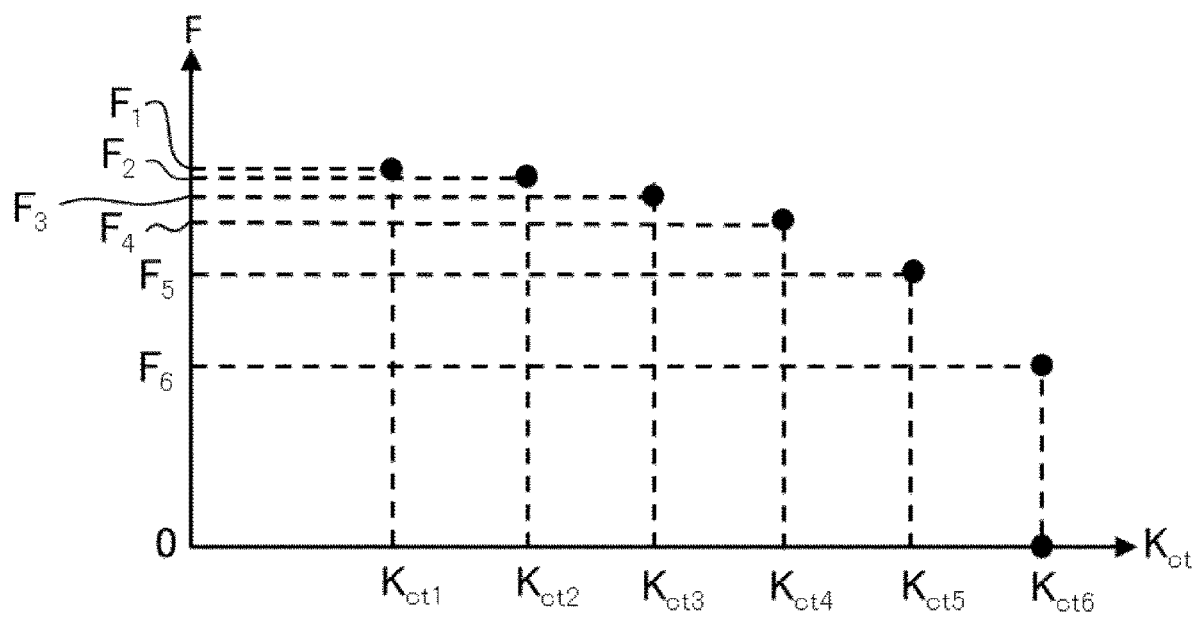
FIG. 9 shows an example of a tool-wear control model according to Embodiment 2 of the present invention.

The tool-wear control unit 24 uses the machining process information and a tool-wear control model being internally preset, to calculate a feeding speed for suppressing a machining defect caused by tool wear. FIG. 9 shows an example of a tool-wear control model according to Embodiment 2 of the present invention. In FIG. 9, the vertical axis represents feeding speeds F. The horizontal axis represents specific cutting forces $K_{ct}$ in the tool rotation direction. FIG. 9 shows a relation between specific cutting force $K_{ct}$ in the tool rotation direction and feeding speed F to be set, the specific cutting force $K_{ct}$ changing from $K_{ct1}$ that is a force at the time when unused, up to $K_{ct6}$ that is a force at the time when reaching the tool life.

The tool-wear control unit 24 uses the tool-wear control model shown in FIG. 9, to calculate a feeding speed F corresponding to the specific cutting force $K_{ct}$ in the tool rotation direction obtained from the machining process information and thereby output the calculated feeding speed F as the correction amount. Note, however, that the tool-wear control model is not limited to that shown in FIG. 9. A mathematical model may be used that serves as a function of the specific cutting force $K_{ct}$ in the tool rotation direction for calculating a feeding speed. Also note that the spindle rotation speed S the axial depth ap of cut or the radial depth ae of cut may be used in place of the feeding speed.

The friction control unit 25 includes friction models corresponding to acceleration/deceleration positions of the feed drive mechanism and turning-around positions thereof. The friction control unit 25 uses the feed drive mechanism state signal to choose a friction model corresponding to the current feed drive mechanism position and output it as a correction amount.

The correction-amount output unit 26 outputs, to the control unit, the correction amount calculated by one unit out of the self-excited-chatter-vibration control unit 21, the forced-chatter-vibration control unit 22, the tool-deflection control unit 23, the tool-wear control unit 24 and the friction control unit 25.

As so far described, in the present embodiment 2, the correction-amount calculation unit 8a switches control rules according to the machining defect cause determined by the countermeasure determination unit 7a. That is, instead of directly choosing a correction amount according to the machining defect cause, the numerical control system 2a chooses a control rule, to thereby calculate a correction amount according to the machining state variable.

Thus, in a case where a machining defect has occurred, the numerical control system 2a according to the present embodiment 2 chooses one control rule out of those corresponding to self-excited chatter vibration, forced chatter vibration, tool deflection, tool wear, and friction in feed drive mechanism, to thereby reduce machining defects with high accuracy.

Embodiment 3

In the description of Embodiment 1 and 2, a machining defect cause is determined on the basis of deviation degrees. In the present embodiment 3, description will be made about a configuration in which selection of a machining defect cause is corrected on the basis of the worker's input in addition to deviation degrees.

Figure 10:
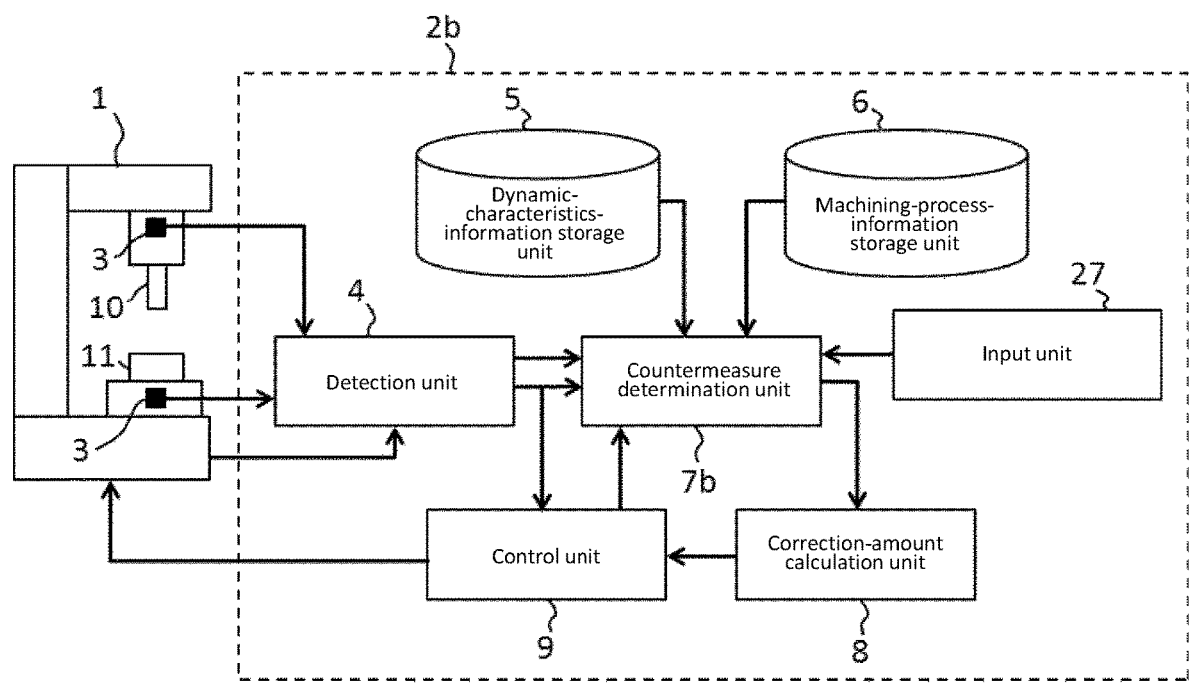
FIG. 10 is a block diagram of a numerical control system according to Embodiment 3 of the present invention.

FIG. 10 is a block diagram of a numerical control system 2b according to Embodiment 3 of the present invention. Note that, in FIG. 10, components identical or equivalent to those shown in FIG. 7 of Embodiment 2 are given the same symbols. Hence, here, description will be made focusing on parts relating to the present embodiment 3.

The numerical control system 2b includes the detection unit 4, the dynamic-characteristics-information storage unit 5, the machining-process-information storage unit 6, a countermeasure determination unit 7b, the correction-amount calculation unit 8, the control unit 9 and an input unit 27. The machine tool 1 includes the sensor 3 and the tool 10, and the workpiece 11 is disposed on the tool.

The input unit 27 receives the worker's inputs, to output choice modification coefficients $Q_1$ to $Q_5$ to the countermeasure determination unit 7b, which will be described later. The worker inputs into the input unit 27, priority degrees $P_1$ to $P_5$ for self-excited chatter vibration, forced chatter vibration, tool deflection, tool wear and friction in feed drive mechanism, respectively.

According to the priority degrees $P_1$ to $P_5$ inputted by the worker, the input unit 27 outputs the choice modification coefficients $Q_1$ to $Q_5$ corresponding to self-excited chatter vibration, forced chatter vibration, tool deflection, tool wear and friction in feed drive mechanism, respectively. For example, the worker inputs an integer of one or larger as the priority degrees $P_1$ to $P_5$; the choice modification coefficients $Q_1$ to $Q_5$ may be determined by, for example, using Formula (19). In Formula (19), n=1 to 5.

[Formula 19]

$$Q_n = \frac{P_n}{P_1 + P_2 + P_3 + P_4 + P_5}$$  (19)

$(n = 1, \ldots, 5)$

Note, however, that the setting range of the priority degrees $P_1$ to $P_5$ is not limited to the above. Furthermore, the priority degrees $P_1$ to $P_5$ inputted directly by the worker may be used as the choice modification coefficients $Q_1$ to $Q_5$.

The countermeasure determination unit 7b receives the dynamic characteristics information outputted from the dynamic-characteristics-information storage unit 5, the machining process information outputted from the machining-process-information storage unit 6, and the cutting condition outputted from the control unit 9. Also, the countermeasure determination unit 7b receives the measurement signal from the detection unit 4, the feed drive mechanism state signal outputted therefrom, and the choice modification coefficients $Q_1$ to $Q_5$ outputted from the input unit 27. In a case where it is determined from the measurement signal or the feed drive mechanism state that a machining defect has occurred, the countermeasure determination unit 7b chooses a machining defect cause and outputs the chosen result, as the countermeasure signal, to the correction-amount calculation unit 8.

In addition to the countermeasure signal, the countermeasure determination unit 7b outputs the dynamic characteristics information, the machining process information, the cutting condition, the feed drive mechanism state signal and the measurement signal. In the process of choosing a machining defect cause, the countermeasure determination unit 7b uses the same method as used by the countermeasure determination unit 7a for calculating the deviation degree $D_n$, to calculate deviation degrees $L_1$ to $L_5$ that are degrees before priority adjustment and which correspond to machining defect causes. Then, the countermeasure determination unit multiplies the pre-priority-adjustment deviation degrees $L_1$ to $L_5$ with the choice modification coefficients $Q_1$ to $Q_5$, respectively, to get deviation degrees $D_n = L_n \times Q_n$ (n=1 to 5); and then, the countermeasure determination unit chooses a machining defect cause corresponding to the largest deviation degree.

As described above, in the present embodiment 3, the countermeasure determination unit 7b obtains deviation degrees $D_n = L_n \times Q_n$ (n=1 to 5) modified on the basis of inputs from the worker. Thus, the numerical control system 2b according to the present embodiment 3 is capable of preferentially taking effective measures on the basis of the worker's determination.

Embodiment 4

Embodiment 3 has described how the choice of a machining defect cause is modified on the basis of the worker's inputs. In the present embodiment 4, description will be made about a configuration in which selection of a machining defect cause is corrected on the basis of machining history.

Figure 11:
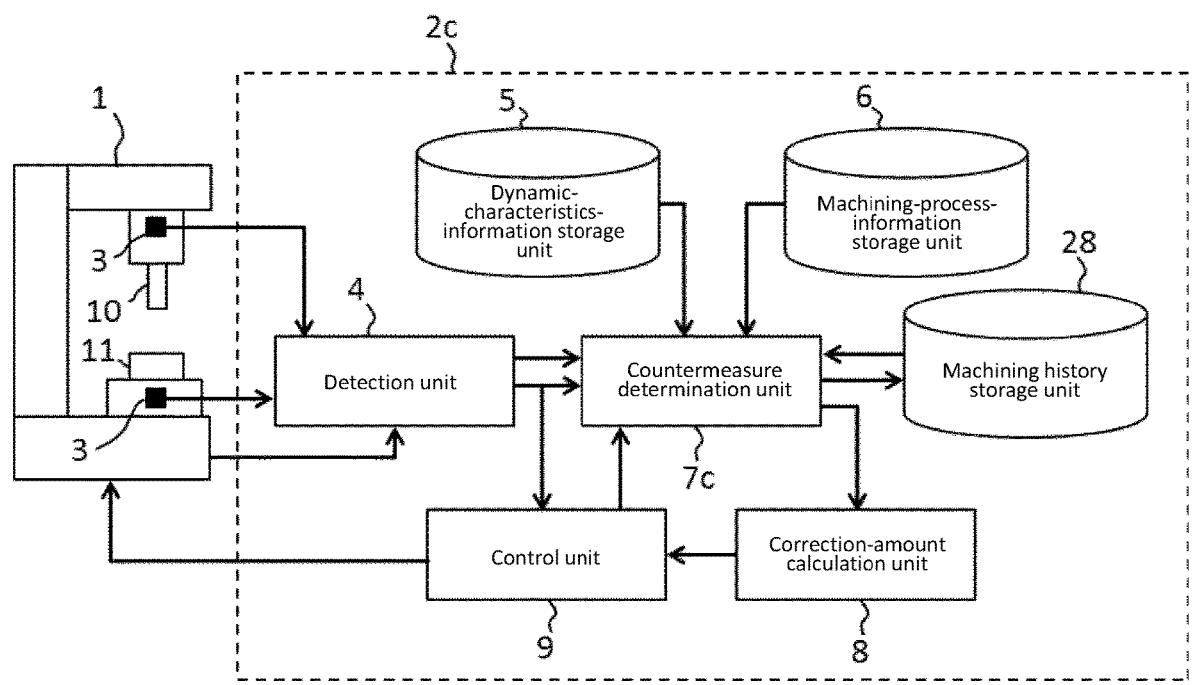
FIG. 11 is a block diagram of a numerical control system according to Embodiment 4 of the present invention.

FIG. 11 is a block diagram of a numerical control system 2c according to Embodiment 4 of the present invention. Note that in FIG. 11, components identical or equivalent to those shown in FIG. 7 of Embodiment 2 are given the same symbols. Hence, here, description will be made focusing on parts relating to the present embodiment 4.

The numerical control system 2c includes the detection unit 4, the dynamic-characteristics-information storage unit 5, the machining-process-information storage unit 6, a countermeasure determination unit 7c, the correction-amount calculation unit 8, the control unit 9 and a machining history storage unit 28. The machine tool 1 includes the sensor 3 and the tool 10, and the workpiece 11 is disposed on the tool.

The machining history storage unit 28 records the results of machining defect causes chosen by the countermeasure determination unit 7c, which is described later, and outputs a choice modification coefficient from the internally-recorded history of the chosen machining defect causes to the countermeasure determination unit 7c. To be more specific, the machining history storage unit 28 stores the numbers of times $H_1$ to $H_5$ by which numbers the countermeasure determination unit 7c chose, in the past, self-excited chatter vibration, forced chatter vibration, tool deflection, tool wear, and friction in feed drive mechanism, respectively, and calculates machining-history-based choice modification coefficients $R_n$ from Formula (20).

[Formula 20]

$$R_n = \frac{H_n}{H_1 + H_2 + H_3 + H_4 + H_5}$$  (20)

$(n = 1, \ldots, 5)$

The countermeasure determination unit 7c receives the dynamic characteristics information, the machining process information, and the cutting condition which are outputted from the dynamic-characteristics-information storage unit 5, the machining-process-information storage unit 6, and the control unit 9, respectively. Also, the countermeasure determination unit receives the measurement signal outputted from the detection unit 4, the feed drive mechanism state signal outputted therefrom and the machining-history-based choice modification coefficients $R_n$ outputted from the machining history storage unit 28. In a case where it is determined from the measurement signal or the feed drive mechanism state signal that a machining defect has occurred, the countermeasure determination unit chooses a machining defect cause and outputs the chosen result to the correction-amount calculation unit 8 as a countermeasure signal.

In addition to the countermeasure signal, the countermeasure determination unit 7c outputs the dynamic characteristics information, the machining process information, the cutting condition, the feed drive mechanism state signal and the measurement signal to the correction-amount calculation unit 8. Furthermore, the countermeasure determination unit 7c outputs the countermeasure signal to the machining history storage unit 28.

In the process of choosing a machining defect cause, the countermeasure determination unit 7c uses the same method as used by the countermeasure determination unit 7a for calculating the deviation degree $D_n$, to calculate pre-history-based-modification deviation degrees $J_1$ to $J_5$ for machining defect causes. Then, the countermeasure determination unit 7c multiplies the pre-history-based-modification deviation degrees with the machining-history-based choice modification coefficients $R_1$ to $R_5$, respectively, to get the deviation degrees $D_n = J_n \times R_n$ (n=1 to 5); and then, the countermeasure determination unit chooses a machining defect cause corresponding to the largest deviation degree.

As so far described, in the present embodiment 4, the countermeasure determination unit 7c obtains deviation degrees modified on the basis of the machining history. Thus, the numerical control system 2c according to the present embodiment 4 is capable of taking effective measures on the basis of priorities indicated by the machining history of the machine tool 1.

Description has been made for Embodiments 1 to 4; however, the scope of the present invention is not limited to the embodiments. The embodiments can be appropriately modified within the scope of the present invention. Also, the embodiments having been described above can be combined into any practical form when necessary.

DESCRIPTION OF SYMBOLS

1: machine tool,
2, 2a, 2b, 2c: numerical control system,
4: detection unit,
5: dynamic-characteristics-information storage unit,
6: machining-process-information storage unit,
7, 7a, 7b, 7c: countermeasure determination unit,
8, 8a: correction-amount calculation unit,
9: control unit,
10: tool,
11: workpiece,
12: cutting condition,
27: input unit,
28: machining history storage unit,
$D_1$: deviation degree for self-excited chatter vibration,
$D_2$: deviation degree for forced chatter vibration,
$D_3$: deviation degree for tool deflection,
$D_4$: deviation degree for tool wear,
$D_5$: friction deviation degree in feed drive mechanism,
$X_n$: machining state variable

The invention claimed is:

1. A numerical control system comprising:
detecting circuitry to obtain cutting force generated in a machine tool;
controlling circuitry to calculate a control amount according to a cutting condition and to control a feed drive mechanism of the machine tool;
a dynamic-characteristics-information storage to store dynamic characteristics information of at least one of a tool and a workpiece, in relation to the cutting condition;
a machining-process-information storage to store information representing a machining process to occur between the tool and the workpiece, in relation to the cutting condition;
countermeasure determining circuitry to determine, from one of the cutting force and a state of the feed drive mechanism of the machine tool, whether a machining defect has occurred, and when it determines that a machining defect has occurred, to calculate a deviation degree for each of multiple different possible causes of the machining defect, and to compare the magnitudes of the calculated deviation degrees for the respective multiple different possible causes to thereby determine a main cause of the machining defect based on the deviation degrees; and
correction-amount calculating circuitry to calculate, according to the main cause of the machining defect determined by the countermeasure determining circuitry, a correction amount with respect to the control amount, and then output the correction amount to the controlling circuitry.

2. The numerical control system according to claim 1, wherein, the countermeasure determining circuitry, when it determines that the machining defect has occurred,
obtains machining state variables corresponding to the possible causes of the machining defect on the basis of at least one among the dynamic characteristics information, the machining process information, the cutting force, the cutting condition and the state of the feed drive mechanism, and
calculates the respective deviation degrees for the multiple different possible causes of the machining defect using the machining state variables corresponding to the multiple different possible causes of the machining defect.

3. The numerical control system according to claim 1, wherein the countermeasure determining circuitry chooses N deviation degrees in descending order of magnitude out of the deviation degrees (N<M (N is an integer equal to one or larger, and M is the number of the deviation degrees)), and determines that N possible causes of the machining defect corresponding to the chosen N deviation degrees are each a cause of the machining defect detected.

4. The numerical control system according to claim 1, wherein the correction-amount calculating circuitry has a control law for calculating the correction amount for the cause of the machining defect.

5. The numerical control system according to claim 1, further comprising an input device capable of entering priorities for the multiple different possible causes of the machining defect into the countermeasure determining circuitry, wherein the countermeasure determining circuitry modifies the deviation degrees on the basis of the priorities received from the input device.

6. The numerical control system according to claim 1, further comprising a machining history storage to store machining history, wherein the countermeasure determining circuitry modifies the deviation degrees on the basis of the machining history.

7. The numerical control system according to claim 1, wherein the multiple different possible causes of the machining defect includes self-excited chatter vibration, forced chatter vibration, tool deflection, tool wear and friction in the feed drive mechanism.

8. The numerical control system according to claim 2, wherein the machining state variables include a spindle rotation speed for self-excited chatter vibration, a spindle rotation speed for forced chatter vibration, a radial depth of cut for tool deflection, a feeding speed for tool wear, and a friction correction amount for friction in the feed drive mechanism.

9. The numerical control system according to claim 1, wherein each of the plurality of deviation degrees indicates a degree of deviation between a reference machining state and a machining state at a time when detecting a machining defect.

10. The numerical control system according to claim 1, wherein the dynamic characteristics information includes a mass equivalent of at least one of the tool and the workpiece, a damping factor equivalent of at least one of the tool and the workpiece, and a spring constant equivalent of at least one of the tool and the workpiece.

* * * * *